United States Patent [19]
Fling et al.

[11] Patent Number: 4,802,363
[45] Date of Patent: Feb. 7, 1989

[54] APPARATUS AND METHOD FOR MEASURING LIQUID DEPTH

[76] Inventors: John J. Fling, 57 Hollister Ranch, Gaviota, Calif. 91325; William F. Fling, 8710 Pershing Dr., Apt. #2, Playa Del Ray, Calif. 90291

[21] Appl. No.: 80,808

[22] Filed: Aug. 3, 1987

[51] Int. Cl.⁴ ............................................. G01F 23/66
[52] U.S. Cl. .................................... 73/315; 73/863.85
[58] Field of Search ............ 73/315, 319, 314, 863.85, 73/864.63; 33/126.4 R, 126.4 A

[56] References Cited
U.S. PATENT DOCUMENTS

| | | | |
|---|---|---|---|
| 884,370 | 4/1908 | Dobson | 73/315 |
| 1,495,292 | 5/1924 | Fields | 73/315 |
| 3,115,782 | 12/1963 | Echtler, Jr. | 73/863.85 |

Primary Examiner—Daniel M. Yasich
Attorney, Agent, or Firm—John H. Lynn

[57] ABSTRACT

A flotation device inside an elongate frame rises to the level of a liquid whose depth is being measured. The flotation device is locked in the frame while the apparatus is withdrawn from the liquid. The liquid level may then read from a scale on the frame.

8 Claims, 4 Drawing Sheets

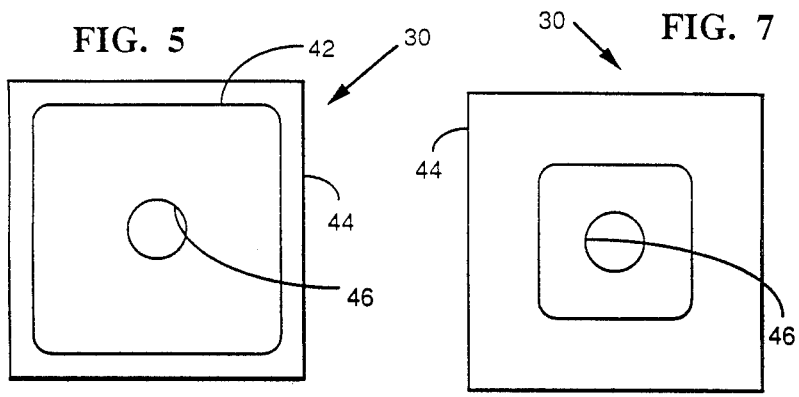
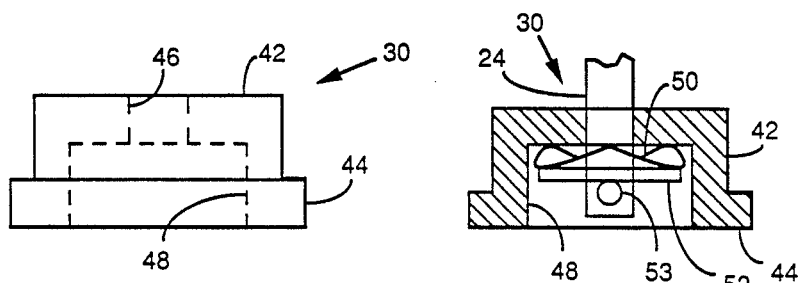
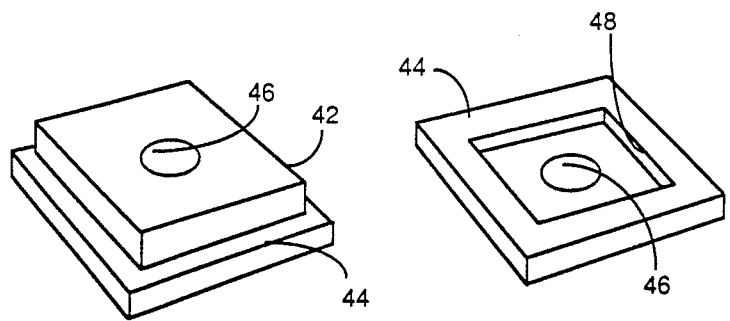

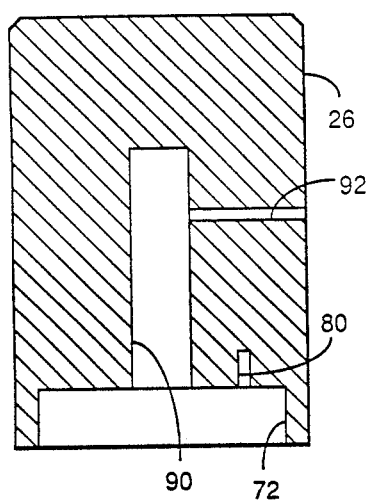
FIG. 16
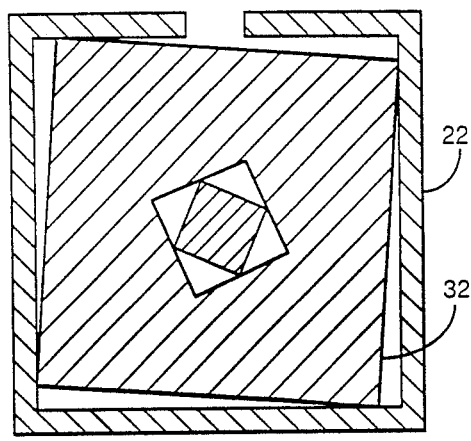
FIG. 19
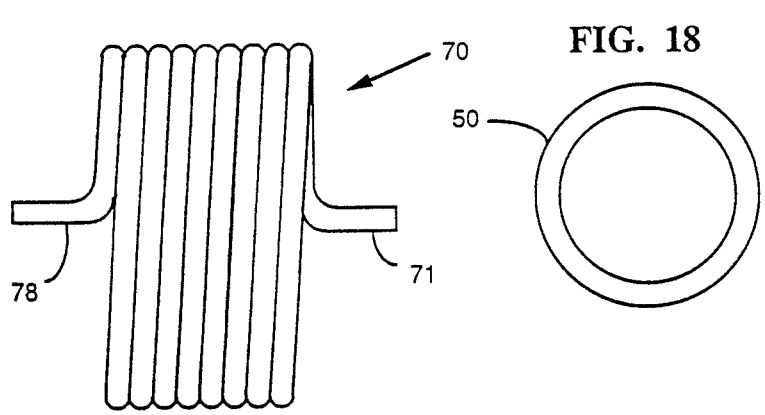
FIG. 17
FIG. 18

APPARATUS AND METHOD FOR MEASURING LIQUID DEPTH

BACKGROUND OF THE INVENTION

This invention relates generally to the measurement of liquid depth and particularly to the measurement of the depth of a liquid in a container such as an underground tank.

There are substantial difficulties involved in making an accurate measurement of the amount of liquid contained in a bulk storage tank. Such tanks may be underground or have opaque walls, which prevents any direct visual inspection of the liquid depth. Typically liquid depths in bulk storage tanks are measured by inserting a long wooden pole into the tank and measuring the depth to which the liquid rose on the pole. This method is inherently inaccurate so that it is possible for a tank to leak part of the contents into the ground for a considerable time without the leak being noticed.

Great care must be exercised in measuring the depth of a liquid such as gasoline because of the risk of fire or explosion. The volatility of many liquids precludes the use of electrical depth measuring apparatus. Therefore there is a need for an accurate technique for measuring fluid depths without increasing the risk of fire or explosion.

SUMMARY OF THE INVENTION

This invention overcomes the difficulties of previous method for measuring liquid depths in bulk storage tanks by providing an easy to use, safe and accurate apparatus and method for making such measurements.

The apparatus according to the invention for measuring the depth of a liquid comprises an elongate frame having an axial passage therethrough. The frame has a lower end and an upper end and includes a flotation device slidably positioned inside the axial passage. The flotation device rises in the frame to the liquid level when the lower end of the frame is placed against the bottom of the tank. The invention also includes means for locking the flotation device inside the frame so that the flotation device remains at the liquid level when the frame is withdrawn from the liquid.

The locking means includes apparatus for rotating the flotation device into frictional engagement with the frame. The locking means may further include a rod mounted in the axial passage in the frame. The rod is selectively engagable with the flotation device such that rotation of the rod within the frame causes the flotation device to rotate into engagement with the frame. The rod may be biased so that a predetermined torque is required to rotate the rod through an angle sufficient to disengage the flotation device and the frame. The spring load keeps the float locked, so that a predetermined torque is required to release from its frictional engagement with the frame.

The biasing means preferably includes an upper end cap mounted to the frame, an upper retainer mounted to the rod, a lower end cap mounted to the frame, a lower retainer mounted to the rod. The biasing means preferably also includes a "wave spring" device mounted between either the lower end cap and the lower retainer or between the upper end cap and the upper retainer such that compression of the wave spring device produces a tension force that keeps the rod in axial alignment with the longitudinal axis of the frame.

The apparatus of the invention may also include an actuator handle mounted to the upper end of the rod so that rotation of the actuator handle rotates the rod inside the frame. The apparatus may further include means for biasing the actuator handle and rod to a quiescent position where the flotation device is free to move axially in the frame.

The method according to the invention for measuring the depth of a liquid comprises the steps of forming an elongate frame having an axial passage therethrough and slidably positioning a flotation device inside the axial passage in the frame, and locking the flotation device inside the frame so that the flotation device remains at the liquid level when the frame is withdrawn from the liquid.

The locking step preferably includes the step of rotating the flotation device into frictional engagement with the frame. The locking step may also include the steps of mounting a rod in the axial passage in the frame, biasing the rod being mounted against rotation within the frame, and selectively engaging the rod with the flotation device such that rotation of the rod within the frame causes the flotation device to rotate into engagement with the frame.

The biasing step may also include the steps of mounting an upper end cap to the frame, mounting an upper retainer to the rod, mounting a lower end cap to the frame and mounting a lower retainer to the rod. The biasing step preferably also includes mounting an elastomeric device mounted between either the lower end cap and the lower retainer or between the upper end cap and the upper retainer such that compression of the elastomeric device produces a frictional force that resists rotation of the rod relative to the frame and mounting an elastomeric device between at least one of the upper end cap and the upper retainer or the lower end cap and the lower retainer such that compression of the elastomeric device produces a frictional force that resists rotation of the rod relative to the frame.

The method of the invention may further include the steps of rotating an actuator handle mounted to the upper end of the rod to rotate the rod inside the frame, and biasing the actuator handle and rod to a quiescent position where the flotation device is free to move axially in the frame.

BRIEF DESCRIPTION OF THE DRAWINGS

FIG. 5 is a top plan view of an end cap that may be placed in a bottom opening in the frame of FIG. 1;

FIG. 6 is a front elevation view of the end cap of FIG. 5;

FIG. 7 is a bottom plan view of the end cap of FIGS. 5 and 6;

FIG. 8 is a cross sectional view of the end cap of FIGS. 5–7;

FIG. 9 is a top perspective view of the end cap of FIGS. 5–8;

FIG. 10 is a bottom perspective view of the end cap of FIGS. 5-9;

FIG. 16 is a cross sectional view of an actuator handle that may be included in the liquid depth measuring apparatus according to the invention;

FIG. 17 shows a coil spring that may be included in the apparatus of the invention;

FIG. 18 is a plan view of a wave spring that may be used to bias the rod of FIG. 14; and FIG. 19 is a top plan view showing the float in a locked position inside the frame.

DESCRIPTION OF THE PREFERRED EMBODIMENT

Figure 2:
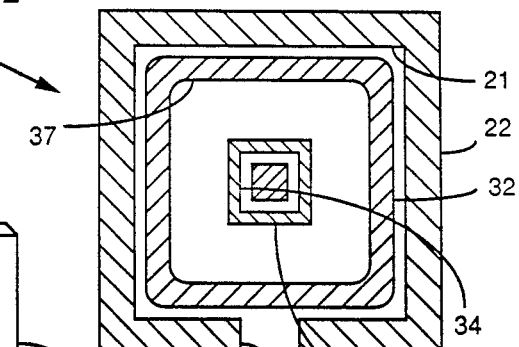
FIG. 2 is a cross section of the liquid depth measuring apparatus of FIG. 1 showing the frame, the float and the rod passing through a hole in the center of the float.
Figure 1:
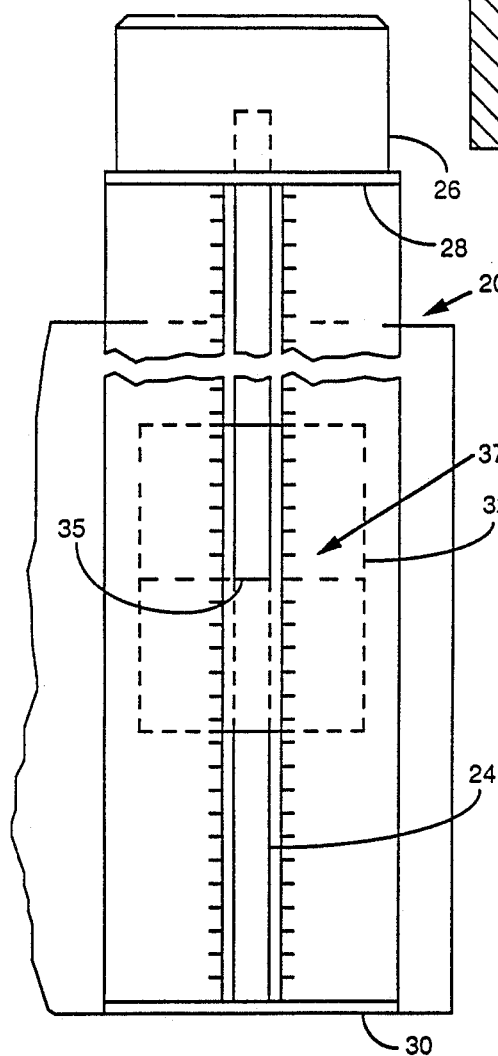
FIG. 1 is a front elevation view of the liquid depth measuring apparatus invention showing a frame, a float inside the frame including a reference mark, a measuring scale on the frame and a handle mounted to a rod that extends through the frame.

Referring to FIGS. 1 and 2, a liquid depth measuring apparatus 20 includes a frame 22, a rod 24 that extends through an axial passage 21 in the frame. The rod 24 extends out the upper and lower ends of the axial passage 21. The liquid depth measuring apparatus 20 also includes an actuator handle 26 connected to the rod 24, an upper end cap 28, a lower end cap 30, and a float 32 that is slidably mounted on the rod 24 inside the frame 22. The liquid depth measuring apparatus 20 may be inserted into a tank 33 to measure the depth of a liquid 35 contained therein. These figures are not drawn to any particular scale. Some dimensions may be in exaggerated proportion to illustrate the structure of the invention.

As best shown in FIG. 2, the frame 22 may be formed to have a generally hollow rectangular cross section. FIG. 2 also shows the frame 22 to have a slot 36 therein. If the frame 22 is made of an opaque material, the slot 36 permits a user of the liquid depth measuring apparatus 20 to view the float 32, which may have a reference line 35 thereon for indicating the depth of a liquid. Referring to FIG. 1, the frame 22 preferably has a measuring scale 37 thereon adjacent the slot 36.

Still referring to FIG. 1, the depth of a liquid in a tank (not shown) is measured by noting which part of measuring scale on the frame 22 is most nearly aligned with the reference line 35 on the float 32 after the lower end of the liquid depth measuring apparatus 20 has been placed against the bottom of the tank. The float 32 may be formed to have a specific gravity that is a known fraction of the specific gravity of the liquid to be measured so that the reference line 35 is even with the liquid level when the float 32 is floating in the liquid.

Figure 3:
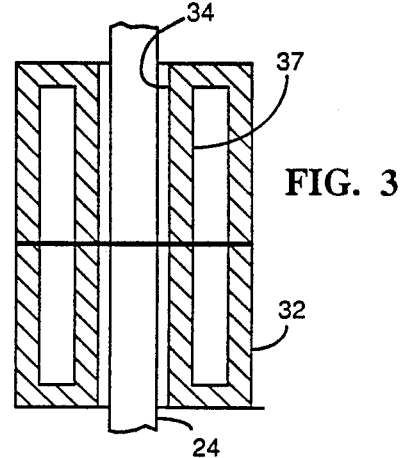
FIG. 3 is a cross sectional view of the float and a portion of the rod.
Figure 4:
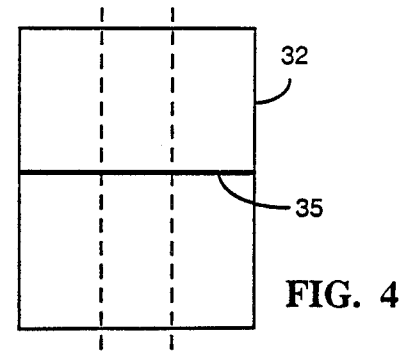
FIG. 4 is front elevation view of the float of FIG. 3.

Referring to FIGS. 2-4, the float 32 may also have generally rectangular horizontal and vertical cross sections, although other symmetrical cross sections may be used. The float 32 may be either solid, multicelled, or it may have a cavity 37 therein. The peripheral dimensions of the float 32 preferably are slightly smaller than the corresponding dimensions of the axial passage 21 in the frame 22 so that the float 32 will be free to move axially within the frame 22. The float 32 should be free to move lengthwise along the rod 24 when the liquid depth measuring apparatus 20 is placed in a liquid to measure its depth.

The float 32 and rod 24 are formed so that rotating the rod 24 about its longitudinal axis causes the float 32 to rotate about its longitudinal axis inside the frame 22. A preferred means for allowing the float 32 to move axially in the frame 22 and to rotate with the rod 24 is to form the float 32 to have an axial rectangular passage 34 therethrough. Thus rotation of the rod engages the outer edges of the rod 24 with the inner surfaces of the float 32, causing the float 32 to tend to rotate with the rod 24. The liquid depth measuring apparatus 20 is then assembled so that the rod 24 extends through the passage 34. The hole 34 should be slightly larger than the rod 24 so that the float is movable lengthwise along the rod 24. The axial passage 34 through the float 32 need not be rectangular as shown in FIG. 2 of the preferred embodiment so long as the axial passage permits longitudinal movement of the float 32 and permits selective engagement of the float 32 with the frame 22.

The rod 24 is preferably mounted in the frame 22 so there is no relative lengthwise movement between them. However, the rod 24 is rotatable about its longitudinal axis in the frame 22. Referring to FIGS. 2 and 19, rotation of the rod 24 causes the float 32 to rotate. Use of the liquid depth measuring apparatus 20 to measure the depth of a fluid in an opaque or underground tank generally requires rotating the rod 24 an amount sufficient to cause the edges of the float 32 to bear against the inner walls of the frame 22. The float 32 and the inner walls of the frame 22 are formed so that the coefficient of sliding friction between them is adequate to support the weight of the float 32 when it is raised above the level of the fluid being measured.

Referring to FIGS. 5-13, the upper end cap 28 and the lower end cap 30 are used to retain the rod 24 in the frame 22. There are many suitable configurations for the upper end cap 28 and the lower end cap 30. FIGS. 5-10 show the structural details of a preferred embodiment of the lower end cap 30 when the frame 22 has a rectangular or square axial passage. This structure may be adapted to function with axial passages having other cross sectional configurations of the frame 22.

The lower end cap 30 has an inner rectangular plate 42 mounted to an outer rectangular plate 44. The inner rectangular plate 42 is preferably formed to fit closely within an opening at the lower end of the frame 22. The outer rectangular plate 44 then acts as a flange to limit the distance that the lower end cap 30 can extend into the frame 22. The lower end cap 30 has a hole 46 through the central portion thereof. The bottom plan view of FIG. 10 shows the lower end cap 30 to have a recess 48 in the central portion of the outer rectangular plate 44.

Figure 14:
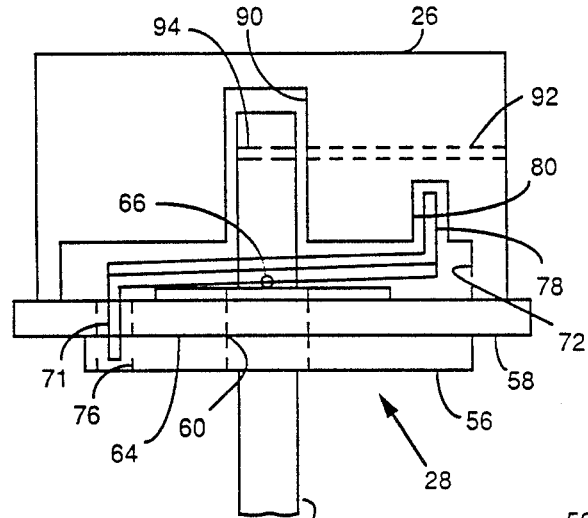
FIG. 14 is a front elevation view of the rod of FIGS. 1 and 3 and apparatus for biasing the rod so that it will return to its original position after being moved by the actuator handle.

A fastener device such as a cotter pin and a biasing spring 50 fit inside the recess 48 as shown in FIGS. 8 and 14. Referring to FIGS. 8 and 14, an end of the rod 24 extends through the hole 46 into the recess 48. The biasing spring 50 may be a wave spring as shown in FIGS. 8, 14 and 18. The biasing device may be any other suitable biasing device such as a compressible elastomeric washer placed around the rod 24. A retainer 52 is then placed over the spring 50, and a pin 53 may then be placed in a passage (not shown) through the rod 24 to prevent the spring 50 and retainer 52 from sliding off the rod 24.

Figure 12:
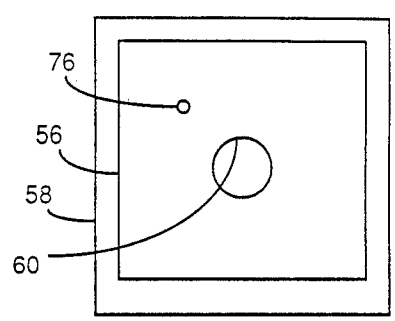
FIG. 12 is a top plan view of the end cap of FIG. 9.
Figure 11:
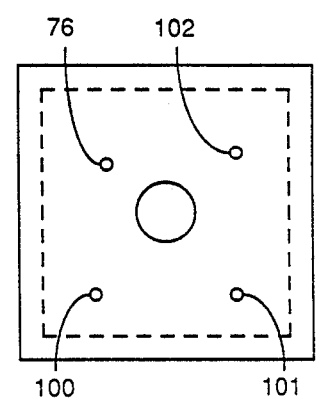
FIG. 11 is a bottom plan view of an end cap that may be placed in an upper opening in the frame of FIG. 1.
Figure 13:
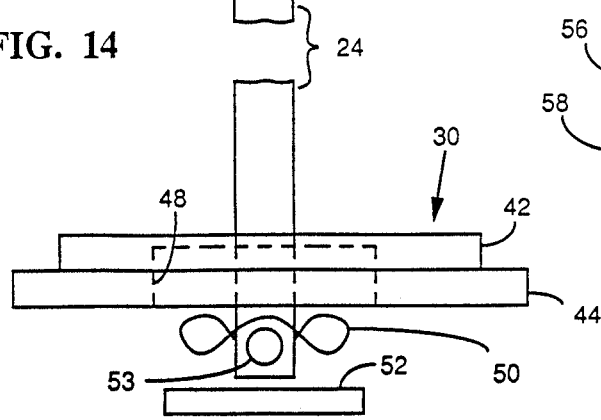
FIG. 13 is an elevation view of the end cap of FIGS. 11 and 12.

Referring to FIGS. 11-13, the upper end cap 28 has an inner rectangle 56 and an outer rectangle 58. When the liquid depth measuring apparatus 20 is assembled, the inner rectangle 56 extends inside the frame 22, and the outer rectangle 58 acts as a flange or stop to limit the distance that the upper end cap 28 can extend into the frame 22. The upper end cap 28 has a hole 60 extending through the central portion thereof for allowing the upper end of the rod 24 to extend through it. Assembly of the liquid depth measuring apparatus 20 involves placing a washer or retainer plate 64 around the upper end of the rod 24 and compressing the spring 50 a distance sufficient to permit a pin 66 to be placed in a passage (not shown) in the upper end of the rod 24.

When the retainers 52 and 64 and their corresponding pins are mounted upon the rod 24 as described above, the spring 50 is compressed between the retainer 52 and the upper wall of the recess 48 in the lower end cap 30. This compression of the spring 50 causes rod 24 to be placed in tension, maintaining concentricity with the axis of frame 22. The force that maintains rod 24 straight and axial with frame 22 should also be large enough to bias rod 24 against rotational movement in the Frame 22 unless a predetermined threshold amount of torque is applied thereto.

Figure 15:
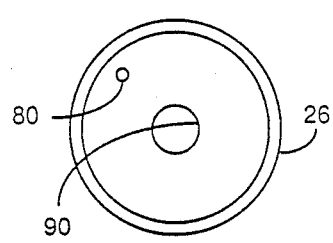
FIG. 15 is a bottom plan view of an actuator handle that may be included in the liquid depth measuring apparatus according to the invention.

Referring to FIGS. 1 and 13-15, the actuator handle 26 is attached to the upper end of the rod 24 to provide convenient means for exerting a torque on the rod 24. The rod 24 extends into a recess 90 in the actuator handle 26. FIGS. 14 and 16 show side views of the recess 90. FIG. 15 is a bottom plan view of the actuator handle 26 showing the passage 90. The portion of the rod 24 extending into the actuator handle 26 may include a passage 94 therethrough, which may be aligned with a passage 92 in the actuator handle 26. A set screw (not shown) or a pin (not shown) may be mounted in the passages 92 and 94 to connect the actuator handle 26 and the rod 24 together. The liquid depth measuring apparatus 20 preferably includes means for biasing the actuator handle 26 toward an engaged position after it has been rotated to disengage the edges of the float 32 and the inner walls of the frame 22. A coil spring 70, best shown in FIG. 17, mounted inside a cavity 72 in the actuator handle 26 is one presently preferred device for biasing the actuator handle 26.

The spring 70 preferably has a first end portion 71 that may be mounted in a retainer hole 76 in the upper end cap 28. A second end portion 78 of the spring 70 is mounted in a retainer hole 80 in the actuator handle 26 at the end of the recess 72. A plurality of guide pins may be mounted in the upper end cap to retain the coil spring in position inside the actuating handle 26. When the ends of the spring 70 are mounted in the retainer holes 76 and 80, the spring 70 is stressed so that float 32 is locked in the position shown in FIG. 19. Rotation of the actuator handle 26 further stresses spring 70, but releases float 32 so that it can move along rod 24 to indicate a liquid level. When the user releases the actuator handle 26, the spring 70 returns it to the normal position and locks the float 32 to its frictional engagement with the inner walls of the frame 22.

What is claimed is:

1. A method for measuring the depth of a liquid contained in a tank or the like, comprising the steps of:
    forming an elongate frame having a lower end and an upper end and a lengthwise passage extending between the upper and lower ends;
    mounting a rod in the lengthwise passage in the frame;
    forming a flotation device to have a passage therethrough;
    mounting the flotation device on the rod so that the rod extends through the passage in the flotation device such that the flotation device may be slidably moved along the rod;
    biasing the rod against rotation within the frame;
    retaining the flotation device in a locked position where it is engaged with the frame to resist axial movement of the flotation device in the frame;
    engaging the rod with the flotation device such that rotation of the rod within the frame causes the flotation device to rotate to an unlocked position out of engagement with the frame where the flotation device may move in the frame to the level of the liquid when the lower end of the frame is placed against the bottom of the tank; and
    locking the flotation device inside the frame by allowing the flotation device to return to the locked position so that the flotation device remains at the position of the liquid level on the frame when the it is withdrawn from the liquid.

2. The method of claim 1 including the step of biasing the rod so that a predetermined torque is required to rotate the rod through an angle sufficient to release the flotation device and the frame.

3. The method of claim 2 wherein the biasing step includes the steps of:
    mounting an upper end cap to the frame;
    mounting an upper retainer to the rod;
    mounting a lower end cap to the frame; and
    mounting a lower retainer to the rod.

4. The method of claim 2 further including the steps of:
    rotating an actuator handle mounted to the upper end of the rod to rotate the rod inside the frame; and
    biasing the actuator handle and rod to a quiescent position where the flotation device is free to move axially in the frame.

5. Apparatus for measuring the depth of a liquid contained in a tank or the like, comprising:
    an elongate frame having a lower end and an upper end and a lengthwise passage extending between the upper and lower ends;
    a rod mounted in the lengthwise passage in the frame;
    a flotation device having a passage therethrough, the flotation device being mounted on the rod so that the rod extends through the passage in the flotation device such that the flotation device is slidable upon the rod;
    first spring means for biasing the rod against rotation within the frame;
    second spring means for holding the flotation device in a locked position where it is frictionally engaged with the frame to resist axial movement of the flotation device in the frame; and
    means cooperating with the rod for rotating the flotation device to an unlocked position such that the flotation device is disengaged from the frame so that the flotation device may move in the frame to the level of the liquid when the lower end of the frame is placed against the bottom of the tank and allowing the flotation device to return to the locked position so that the flotation device remains in position to indicate the liquid depth in the tank when the frame is withdrawn from the liquid.

6. The apparatus of claim 5 wherein the first spring means biases the rod so that a predetermined torque is required to rotate the rod through an angle sufficient to permit the flotation device to float to the liquid level.

7. The apparatus of claim 6 wherein the first spring means holds the rod in tension in the frame.

8. The apparatus of claim 1, further comprising:
an actuator handle connected to the rod, the second spring means being connected to the actuator handle to exert a torque thereon;
means formed on the rod to engage at least a portion of an inner wall of the passage in the flotation device for transmitting torque from the handle to the flotation device to hold the flotation device in its locked position.

* * * * *